(12) United States Patent
Propheter-Hinckley

(10) Patent No.: US 11,661,850 B2
(45) Date of Patent: May 30, 2023

(54) AIRFOIL WITH CONVEX SIDES AND MULTI-PIECE BAFFLE

(71) Applicant: United Technologies Corporation, Farmington, CT (US)

(72) Inventor: Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 488 days.

(21) Appl. No.: 16/532,626

(22) Filed: Aug. 6, 2019

(65) Prior Publication Data
US 2020/0149402 A1    May 14, 2020

Related U.S. Application Data

(60) Provisional application No. 62/757,926, filed on Nov. 9, 2018.

(51) Int. Cl.
*F01D 5/14*    (2006.01)

(52) U.S. Cl.
CPC .......... *F01D 5/141* (2013.01); *F05D 2220/32* (2013.01); *F05D 2240/126* (2013.01); *F05D 2250/711* (2013.01)

(58) Field of Classification Search
CPC ................. F01D 5/188; F01D 5/189
See application file for complete search history.

(56) References Cited

U.S. PATENT DOCUMENTS

| | | | | |
|---|---|---|---|---|
| 4,696,621 A | * | 9/1987 | Hamblett | ................ F01D 5/141 |
| | | | | 415/191 |
| 4,798,515 A | * | 1/1989 | Hsia | ...................... F01D 17/162 |
| | | | | 415/115 |
| 7,104,756 B2 | | 9/2006 | Harding et al. | |
| 10,012,106 B2 | | 7/2018 | Spangler et al. | |

FOREIGN PATENT DOCUMENTS

| | | |
|---|---|---|
| EP | 1674660 | 6/2006 |
| EP | 3184750 | 6/2017 |

OTHER PUBLICATIONS

European Search Report for European Patent No. 19207541.4 completed Apr. 1, 2020.

\* cited by examiner

*Primary Examiner* — Woody A Lee, Jr.
*Assistant Examiner* — Cameron A Corday
(74) *Attorney, Agent, or Firm* — Carlson, Gaskey & Olds, P.C.

(57) ABSTRACT

An airfoil includes an airfoil section that has an airfoil wall that defines a leading end, a trailing end, and first and second convex sides that join the leading end and the trailing end. The first and second convex sides span in a longitudinal direction between first and second ends. The first and second convex sides define lateral bounds of an internal core cavity, and the first and second convex sides converge toward each other at each of the first and second ends such that the internal core cavity constricts at the first and second ends. A multi-piece baffle is disposed in the internal core cavity and has a shape that is complementary to the first and second convex sides.

22 Claims, 5 Drawing Sheets

AIRFOIL WITH CONVEX SIDES AND MULTI-PIECE BAFFLE

CROSS-REFERENCE TO RELATED APPLICATION

This application claims priority to United States Provisional Application No. 62/757,926 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall that defines a leading end, a trailing end, and first and second convex sides that join the leading end and the trailing end. The first and second convex sides span in a longitudinal direction between first and second ends. The first and second convex sides define lateral bounds of an internal core cavity, and the first and second convex sides converge toward each other at each of the first and second ends such that the internal core cavity constricts at the first and second ends. A multi-piece baffle is disposed in the internal core cavity and having a shape complementary to the first and second convex sides.

In a further embodiment of any of the foregoing embodiments, the multi-piece baffle includes a first baffle piece and a second baffle piece that longitudinally overlaps with the first baffle piece.

In a further embodiment of any of the foregoing embodiments, the first and second baffle pieces include complementary baffle surfaces that meet at a sloped interface in the internal core cavity.

In a further embodiment of any of the foregoing embodiments, the sloped interface slopes from the second convex side to the first convex side.

In a further embodiment of any of the foregoing embodiments, the complementary baffle surfaces are planar.

In a further embodiment of any of the foregoing embodiments, the complementary baffle surfaces are non-planar.

In a further embodiment of any of the foregoing embodiments, the complementary baffle surfaces are arced.

In a further embodiment of any of the foregoing embodiments, the multi-piece baffle includes a first baffle piece and a second baffle piece. The first and second baffle pieces include side surfaces. The side surface of the first baffle piece is complementary to the second convex side, and the side surface of the second baffle is complementary to the first convex side.

In a further embodiment of any of the foregoing embodiments, the airfoil section includes a rib in the internal core cavity connecting the first and second convex sides. The rib partitions the internal core cavity into an aft cavity and a forward cavity adjacent the leading end, and the multi-piece baffle is in the forward cavity.

In a further embodiment of any of the foregoing embodiments, the converging of the first and second convex sides toward each other at each of the first and second ends forms first and second narrowed openings at the first and second ends. The multi-piece baffle includes a first baffle piece and a second baffle piece, the first baffle piece fits through the first narrowed opening, and the second baffle piece fits through the second narrowed opening.

A gas turbine engine according to an example of the present disclosure include a compressor section, a combustor in fluid communication with the compressor section, and a turbine section in fluid communication with the combustor. The turbine section has a turbine airfoil according to any of the foregoing embodiments.

In a further embodiment of any of the foregoing embodiments, the multi-piece baffle includes a first baffle piece and a second baffle piece that longitudinally overlaps with the first baffle piece.

In a further embodiment of any of the foregoing embodiments, the first and second baffle pieces include complementary baffle surfaces that meet at a sloped interface in the internal core cavity.

In a further embodiment of any of the foregoing embodiments, the complementary baffle surfaces are planar.

In a further embodiment of any of the foregoing embodiments, the complementary baffle surfaces are non-planar.

In a further embodiment of any of the foregoing embodiments, the multi-piece baffle includes a first baffle piece and a second baffle piece. The first and second baffle pieces include side surfaces. The side surface of the first baffle piece is complementary to the second convex side, and the side surface of the second baffle piece is complementary to the first convex side.

In a further embodiment of any of the foregoing embodiments, the airfoil section includes a rib in the internal core cavity connecting the first and second convex sides. The rib partitions the internal core cavity into an aft cavity and a forward cavity adjacent the leading end, and the multi-piece baffle is in the forward cavity.

A method for assembling an airfoil according to any of the foregoing embodiments includes inserting the multi-piece baffle into the internal core cavity or, if the multi-piece baffle is already in the internal core cavity, removing the multi-piece baffle from the internal core cavity. The multi-piece baffle has a shape that is complementary to the first and second convex sides.

In a further embodiment of any of the foregoing embodiments, the multi-piece baffle includes a first baffle piece and a second baffle piece. The first and second baffle pieces include side surfaces. The side surface of the first baffle piece is complementary to the first convex side, and the side surface of the second baffle is complementary to the second convex side, and the inserting and removing each includes moving the first baffle piece through the first end of the airfoil section and moving the second baffle piece through the second end of the airfoil section.

In a further embodiment of any of the foregoing embodiments, the moving includes rotating the first baffle piece and rotating the second baffle piece.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
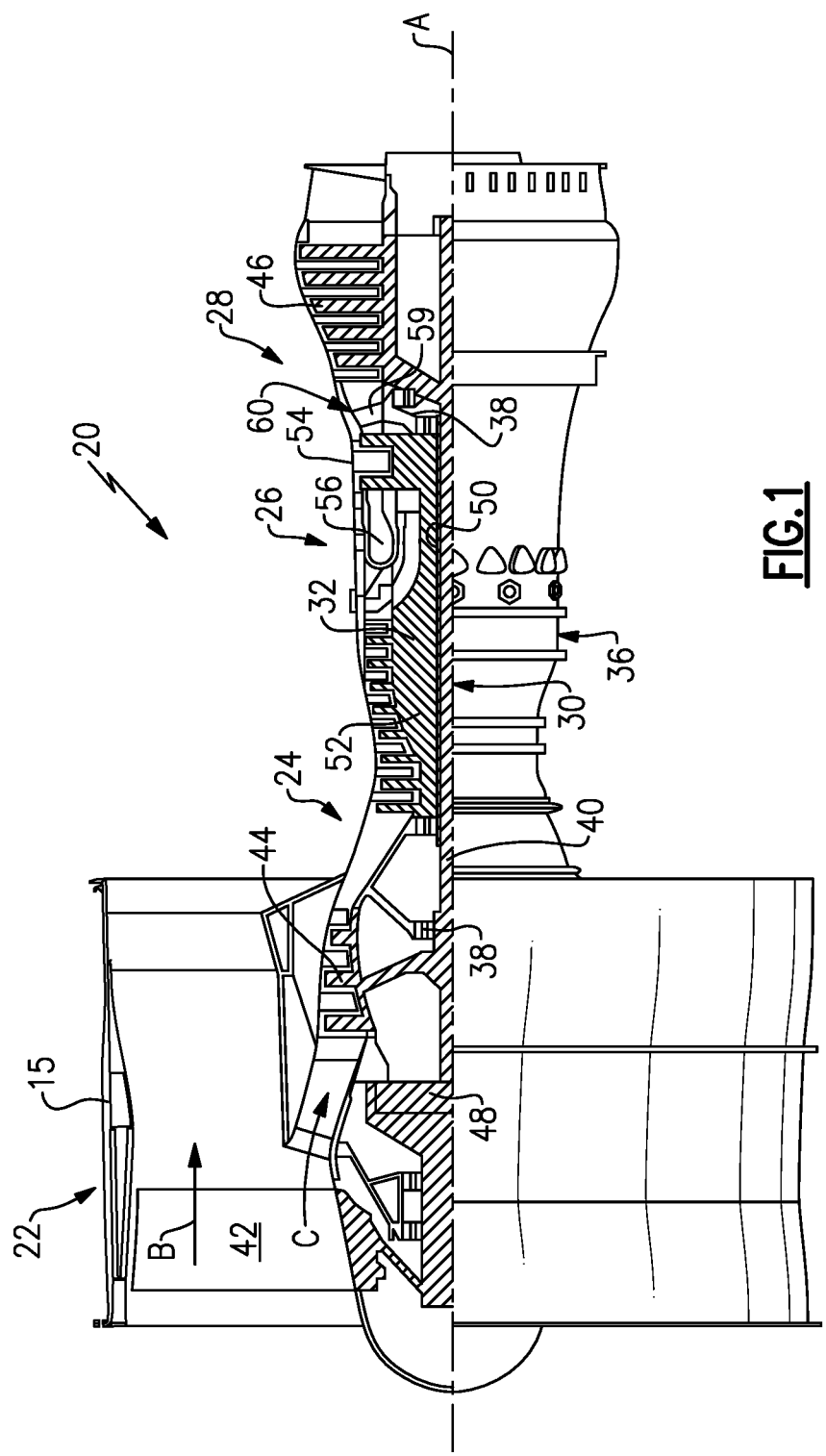
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
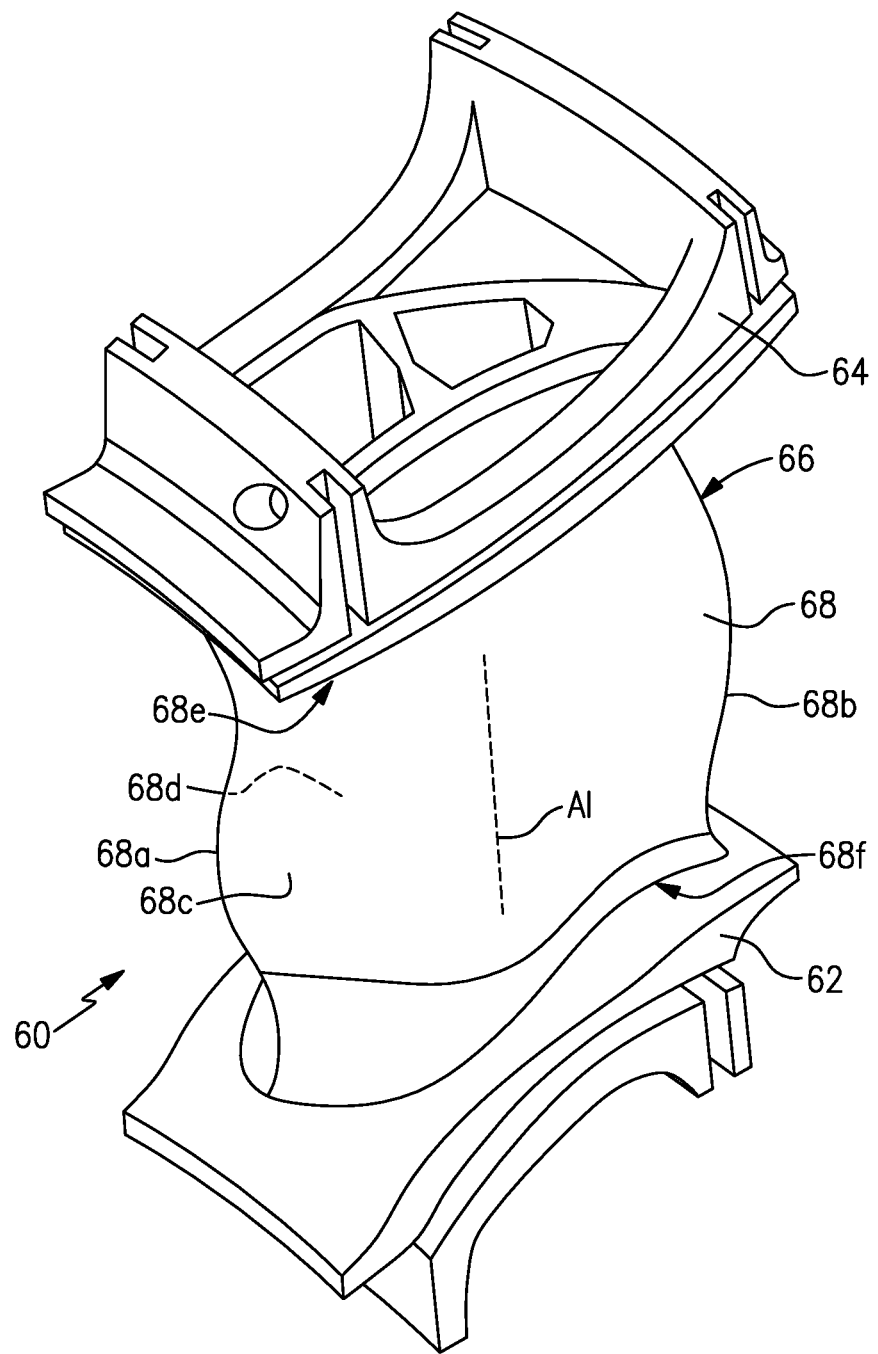
FIG. 2 illustrates an example airfoil of the engine of FIG. 1.

FIG. 2 illustrates a representative example of a turbine airfoil 60 used in the turbine engine 20 (see also FIG. 1).

The turbine airfoil 60 includes an inner or first platform 62, an outer or second platform 64, and an airfoil section 66 that radially spans between the inner and outer platforms 62/64. Terms such as "radially," "axially," or variations thereof are used herein to designate directionality with respect to the engine central axis A.

The airfoil section 66 includes an airfoil outer wall 68 that delimits the profile of the airfoil section 66. The outer wall 68 defines a leading end 68a, a trailing end 68b, and first and second sides 68c/68d that join the leading and trailing ends 68a/68b. The first and second sides 68c/68d span in a longitudinal direction, denoted by axis A1, between first and second ends 68e/68f. The first and second ends 68e/68f are attached, respectively, to the first and second platforms 62/64. The ends 68e/68f refer to end regions and not necessarily to the terminal edges. In this example, the leading end 68a and the trailing end 68b are both convex with respect to the axial middle of the airfoil section 66. That is, the leading end 68a and the trialing end 68b bow outwards relative to the middle of the airfoil section 66. In the illustrated example, the first side 68c is a pressure side and the second side 68d is a suction side.

Figure 3:
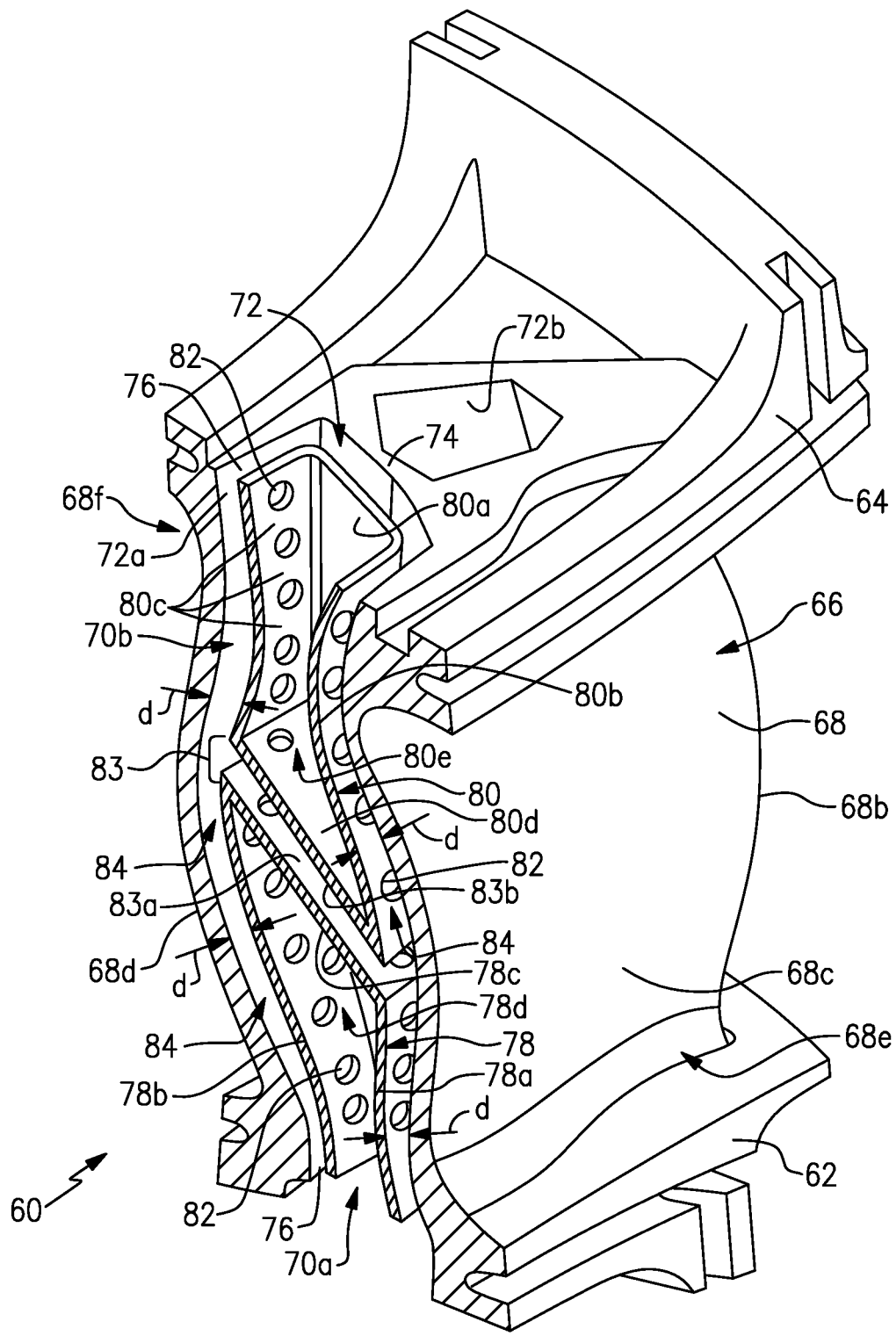
FIG. 3 illustrates a partial cutaway view of the airfoil of FIG. 2.

Referring also to FIG. 3, which illustrates a partial cutaway view of the airfoil 60, the first and second sides 68c/68d of the airfoil section 66 are convex and bow outwards relative to the middle of the airfoil section 66. As an example, the first and second sides 68c/68d each have a mono-convexity in which the first and second sides 68c/68d each only have a single convex "hill," as opposed to multiple hills and valleys.

The first and second sides 68c/68d converge toward each other at the first and second ends 68e/68f. For example, the converging of the first and second sides 68c/68d forms first and second narrow openings 70a/70b (see also FIG. 6) at the first and second ends 68e/68f. The airfoil section 66 is thus of greatest girth around its mid-span region and is of narrower girth at the first and second ends 68e/68f. For example, the maximum girth of the airfoil section 66 is between a 30% span and a 70% span between the first and second ends 68e/68f, and in a further example the maximum is be between 40% span and 60% span.

The outer wall 68 of the airfoil section 66 circumscribes an internal core cavity 72. The airfoil section 66 further includes a rib 74 in the internal core cavity 72. The rib 74 partitions the internal core cavity 72, diving the cavity 72 into a forward cavity 72a and an aft cavity 72b. The leading end 68a and the rib 74 define the fore and aft bounds of the forward cavity 72a. The first and second sides 68c/68d define the lateral bounds of the forward cavity 72a. In this example, the rib 74 extends from the first side 68c to the second side 68d and is solid and free of any orifices. The rib 74 thereby fluidly isolates the forward and aft cavities 72a/72b of the internal core cavity 72.

A multi-piece baffle 76 (hereafter "baffle 76") is disposed in the forward cavity 72a to enhance cooling of the leading end 68a and forward portions of the first and second sides 68c/68d. As will be appreciated, the baffle 76 alternatively be in the aft cavity 72b, baffles may be included both the forward and aft cavities 72a/72b.

In this example, the baffle 76 includes first and second baffle pieces 78/80. The baffle pieces 78/80 provide a shape that is complementary to the shape of the forward cavity 72a and, particularly, a shape that is complementary to the first and second sides 68c/68d.

The first baffle piece 78 includes a forward wall (not shown, cutaway), an aft wall (not shown), lateral walls 78a/78b, and a mating wall 78c. The walls define an interior chamber 78d. The bottom of the first baffle piece 78 near the first end 68e of the airfoil section 66 is open, to receive cooling air. The shape of the lateral wall 78b is complementary to the shape of the first side 68d of the airfoil section 66, and the shape of the lateral wall 78a is complementary to the shape of the first side 68c of the airfoil section 66. In this example, the lateral walls 78a/78b include impingement orifices 82.

The second baffle piece 80 includes a forward wall (not shown, cutaway), an aft wall 80a, lateral walls 80b/80c, and a mating wall 80d. The walls define an interior chamber 80e. The top of the second baffle piece 80 near the second end 68f of the airfoil section 66 is open, to receive cooling air. The shape of the lateral wall 80c is complementary to the shape of the first side 68d of the airfoil section 66, and the shape of the lateral wall 80b is complementary to the shape of the first side 68c of the airfoil section 66. In the illustrated example, the lateral walls 80b/80c also include impingement orifices 82.

Figure 4:
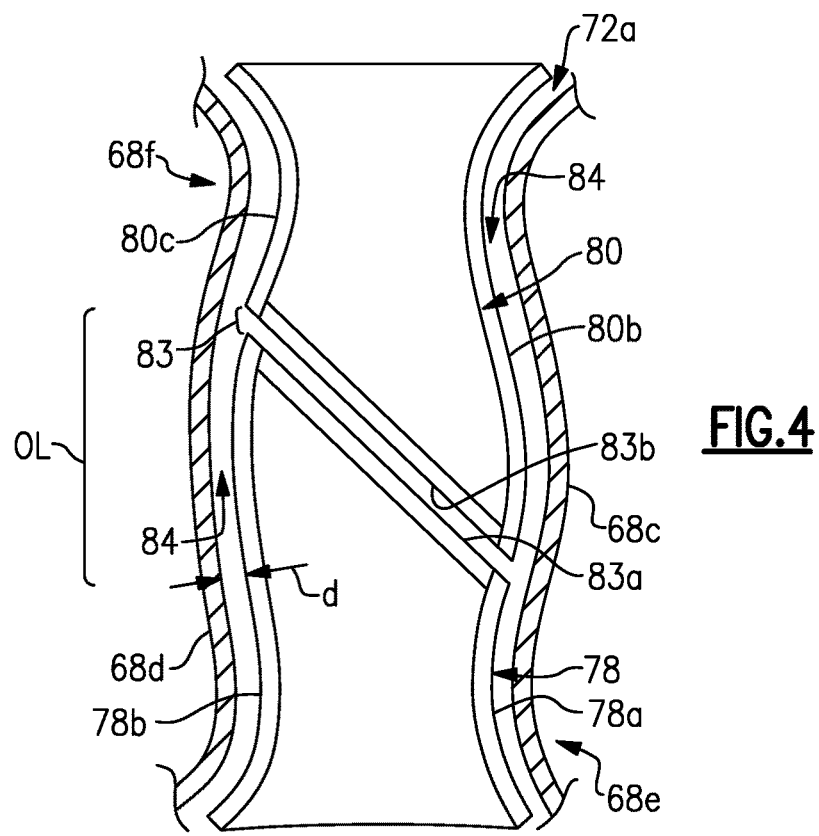
FIG. 4 illustrates a sectioned axial view of the airfoil of FIG. 2.

The baffle 76 is in a fixed position in the forward cavity 72a. For instance, the first baffle piece 78 can be welded or otherwise affixed with the first platform 62, and the second baffle piece 80 can be welded or otherwise affixed with the second platform 64. In the fixed position, as also shown in FIG. 4, the baffle pieces 78/80 longitudinally overlap over a span region OL and the mating walls 78c/80d meet at a sloped interface 83 but do not touch. In this example, the sloped interface 83 slopes from the second side 68d to the first side 68c.

Figure 5:
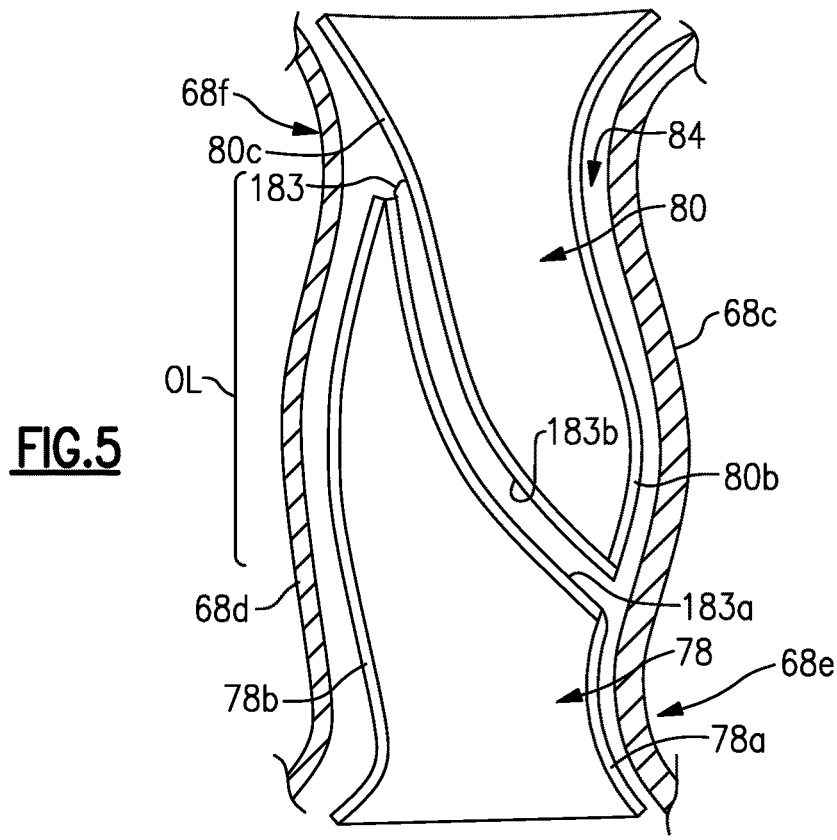
FIG. 5 illustrates a sectioned axial view of another example airfoil in which the baffle has non-planar mating surfaces.

The mating walls 78c/80d define respective complementary baffle surfaces 83a/83b. In this example, the baffle surfaces 83a/83b are complementary to each other and are both planar, and the sloped interface 83 is thus planar. In a modified example in FIG. 5, the baffle surfaces 183a/183b are both non-planar and the sloped interface 83 is thus curved. In that example, the baffle surfaces 183a/183b are arced. For instance, the baffle surface 183a is concave and the baffle surface 183b is convex, although it is also contemplated that the baffle surface 183a could be convex and the baffle surface 183b could be concave.

Referring to FIGS. 3 and 4, in the fixed position, there is a gap 84 surrounding the baffle 76. The gap 84 provides a stand-off distance (d) between the baffle 76 and the rib 74, between the baffle 76 and the leading end 68a, and between the baffle 76 and each of the first and second sides 68c/68d. Because the geometry of the baffle 76 is complementary to the geometry of the first and second sides 68c/68 (and also to the rib 74 and leading end 68a), the gap 84 is substantially constant. In turn, the stand-off distance (d) is substantially constant around the baffle 76. As will be appreciated, due to manufacturing and assembly tolerances, the gap 84 and stand-off distance (d) may vary somewhat.

The size of the gap 84 and stand-off distance (d) are selected according to cooling performance requirements. For instance, during operation of the engine 20, cooling air, such as bleed air from the compressor section 24, is provided through the first platform 62 into the interior chamber 78d of the first baffle piece 78 and through the second platform 64 into the interior chamber 80e of the second baffle piece 80. The cooling air flows out from the interior chambers 78d/80e through the impingement orifices 82 and impinges on the first and second sides 68c/68d, thereby cooling the sides 68c/68d.

The shape of the airfoil section 66 and, in particular the convex first and second sides 68c/68d, are designed for aerodynamic performance. However, the convex shape challenges the use of a baffle for enhanced impingement cooling. More specifically, the pressure and suction sides of a typical airfoil section of a turbine airfoil for a gas turbine engine are not convex. Rather, the pressure and suctions sides are straight in the longitudinal (radial) direction. When the pressure and suction sides are straight, or even congruently curved or convergent toward the middle of the airfoil, a baffle can be readily inserted into the cavity. However, when the pressure and suction sides are convex for enhanced aerodynamic performance, the internal core cavity is larger in the mid-span and narrower at the ends, i.e., "barrel-shaped," with substantially narrowed openings at the ends for insertion of a baffle. To obtain a constant gap and stand-off distance in such a cavity, a single baffle would need to have a complementary barrel-shape. Because the cavity is narrower at the ends, it is impossible to fit a barrel-shaped baffle through one of the narrow ends into the cavity. A constant gap and stand-off distance is thus unobtainable.

In contrast, the first and second baffle pieces 78/80 of the baffle 76 of the disclosed airfoil section 66 enable the use of the baffle 76 in combination with the convex first and second sides 68c/68d. The shapes of the baffle pieces 78/80 are such that the baffle pieces 78/80 can be readily inserted, or removed, through the narrow openings 70a/70b without undue interference. For instance, the baffle pieces 78/80 together have a barrel-shape profile but are separated through the large part of the barrel along the sloped interface 83/183. By being separate, each baffle piece 78/80 has a thinner profile that can fit through the openings 70a/70b.

Figure 6:
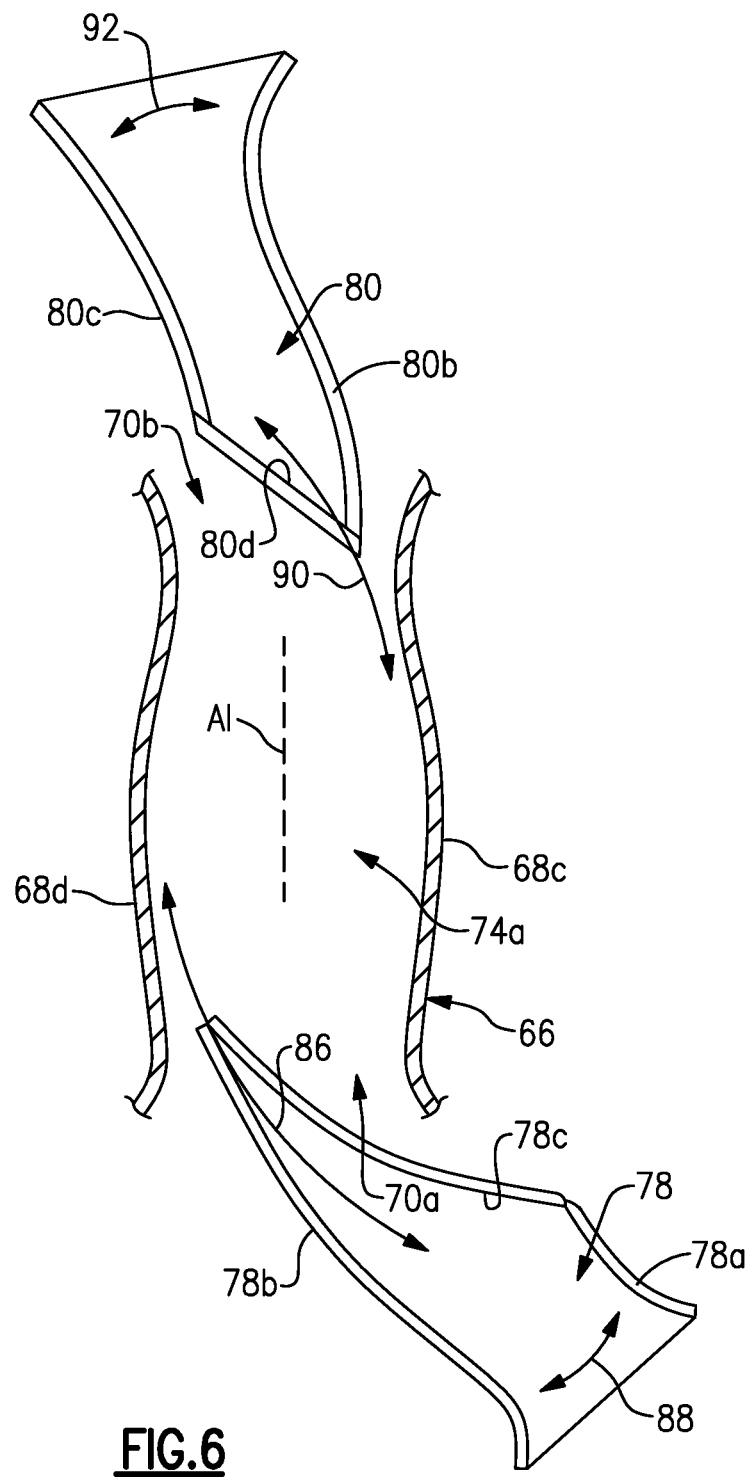
FIG. 6 illustrates an example method of inserting a multi-piece baffle into the internal core cavity or, if the multi-piece baffle is already in the internal core cavity, removing the multi-piece baffle from the internal core cavity.

As an example, FIG. 6 demonstrates a method of either inserting the baffle pieces 78/80 into, or removing the baffle pieces 78/80 from, the forward cavity 74a. The inserting or removing may be conducted during an original assembly operation or during a repair or replacement process.

As an example, to either insert or remove the first baffle piece 78 from the forward cavity 74a, the first baffle piece 78 is moved along a curved path, designated at 86. During the movement, the first baffle piece 78 may also be rotated, as represented at 88, so that the lateral wall 78b follows the second side 68d. That is, the result of the combined movement along the curved path 86 and the rotation 88 is that the lateral wall 78b remains near the second side 68d of the airfoil section 66.

To either insert or remove the second baffle piece 80 from the forward cavity 74a, the second baffle piece 80 is also moved along a curved path, designated at 90. During the movement, the second baffle piece 80 may also be rotated, as represented at 92, so that the lateral wall 80b follows the first side 68c. That is, the result of the combined movement along the curved path 90 and the rotation 92 is that the lateral wall 80b remains near the first side 68c of the airfoil section 66.

The curved paths 86/90 and rotational movement 88/92 permit the baffle pieces 78/80 to fit through the narrow openings 70a/70b. For instance, although the baffle pieces 78/80 are individually thinner than a single barrel-shaped baffle would be, each baffle piece 78/80 is still wide enough, in certain orientations relative to the openings 70a/70b, to interfere with the openings 70a/70b. As an example, if the baffle pieces 78/80 were moved linearly and straight into the forward cavity 74a along the longitudinal direction A1, the sides or corners of the baffle pieces 78/80 would interfere with the sides 68c/68d of the airfoil section 66 and prevent movement through the openings 70a/70b because the baffle pieces 78/80 are wider than the openings 70a/70b when in such an orientation. However, by moving the baffle pieces 78/80 along the curved paths, and rotating the baffle pieces 78/80, the orientations of the baffle pieces 78/80 are continually adjusted so that the widths of the portions of the baffle pieces 78/80 that are moving through the openings 70a/70b are narrower than the openings 70a/70b and thus fit through.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section having an airfoil wall defining a leading end, a trailing end, and first and second convex sides joining the leading end and the trailing end, the first and second convex sides spanning in a longitudinal direction between first and second ends,
the first and second convex sides defining lateral bounds of an internal core cavity, and the first and second convex sides being bowed such that the airfoil section is of a maximum girth around a mid-span region of the airfoil section between the first and second ends and the first and second convex sides converging toward each other at each of the first and second ends such that the internal core cavity constricts at the first and second ends; and
a multi-piece baffle disposed in the internal core cavity and having a shape complementary to the first and second convex sides.

2. The airfoil as recited in claim 1, wherein the multi-piece baffle includes a first baffle piece and a second baffle piece that longitudinally overlaps with the first baffle piece.

3. The airfoil as recited in claim 2, wherein the first and second baffle pieces include complementary baffle surfaces that meet at a sloped interface in the internal core cavity.

4. The airfoil as recited in claim 3, wherein the sloped interface slopes from the second convex side to the first convex side.

5. The airfoil as recited in claim 4, wherein the complementary baffle surfaces are planar.

6. The airfoil as recited in claim 4, wherein the complementary baffle surfaces are non-planar.

7. The airfoil as recited in claim 4, wherein the complementary baffle surfaces are arced.

8. The airfoil as recited in claim 2, wherein the multi piece baffle includes a first baffle piece and a second baffle piece, the first and second baffle pieces include side surfaces, the side surface of the first baffle piece is complementary to the second convex side, and the side surface of the second baffle is complementary to the first convex side.

9. The airfoil as recited in claim 1, wherein the airfoil section includes a rib in the internal core cavity connecting the first and second convex sides, the rib partitioning the internal core cavity into an aft cavity and a forward cavity adjacent the leading end, and the multi-piece baffle is in the forward cavity.

10. The airfoil as recited in claim 1, wherein the converging of the first and second convex sides toward each other at each of the first and second ends forms first and second narrowed openings at the first and second ends, the multi-piece baffle includes a first baffle piece and a second baffle piece, the first baffle piece fits through the first narrowed opening, and the second baffle piece fits through the second narrowed opening.

11. A gas turbine engine comprising:
a compressor section;
a combustor in fluid communication with the compressor section; and
a turbine section in fluid communication with the combustor,
the turbine section having a turbine airfoil that includes
an airfoil section having an airfoil wall defining a leading end, a trailing end, and first and second convex sides joining the leading end and the trailing end, the first and second convex sides spanning in a longitudinal direction between first and second ends,
the first and second convex sides defining lateral bounds of an internal core cavity, and the first and second convex sides bowing such that the airfoil section is of a maximum girth around a mid-span region of the airfoil section between the first and second ends and the first and second convex sides converging toward each other at each of the first and second ends such that the internal core cavity constricts at the first and second ends, and
a multi-piece baffle disposed in the internal core cavity and having a shape complementary to the first and second convex sides.

12. The gas turbine engine as recited in claim 11, wherein the multi-piece baffle includes a first baffle piece and a second baffle piece that longitudinally overlaps with the first baffle piece.

13. The gas turbine engine as recited in claim 12, wherein the first and second baffle pieces include complementary baffle surfaces that meet at a sloped interface in the internal core cavity.

14. The gas turbine engine as recited in claim 13, wherein the complementary baffle surfaces are planar.

15. The gas turbine engine as recited in claim 13, wherein the complementary baffle surfaces are non-planar.

16. The gas turbine engine as recited in claim 11, wherein the multi-piece baffle includes a first baffle piece and a second baffle piece, the first and second baffle pieces include side surfaces, the side surface of the first baffle piece is complementary to the second convex side, and the side surface of the second baffle piece is complementary to the first convex side.

17. The gas turbine engine as recited in claim 11, wherein the airfoil section includes a rib in the internal core cavity connecting the first and second convex sides, the rib partitioning the internal core cavity into an aft cavity and a forward cavity adjacent the leading end, and the multi-piece baffle is in the forward cavity.

18. The airfoil as recited in claim 1, wherein the mid-span region is from a 30% span to a 70% span of the airfoil section.

19. The airfoil as recited in claim 18, wherein the mid-span region is from a 40% span to a 60% span of the airfoil section.

20. The airfoil as recited in claim 1, wherein the internal core cavity constricts at the first and second ends relative to the internal cavity in the mid-span region.

21. The airfoil as recited in claim 1, wherein the leading end and the trailing end are both convex.

22. The airfoil as recited in claim 1, wherein there is a constant stand-off distance between the multi-piece baffle and the first and second convex sides.

* * * * *